United States Patent
Aagard et al.

[15] 3,705,395
[45] Dec. 5, 1972

[54] MAGNETO-OPTIC READOUT SYSTEM

[72] Inventors: Roger L. Aagard, Minneapolis; Francis M. Schmit, St. Louis Park, both of Minn.

[73] Assignee: Honeywell Inc., Minneapolis, Minn.

[22] Filed: May 3, 1971

[21] Appl. No.: 139,422

[52] U.S. Cl. ........340/174 YC, 340/173 LT, 350/151
[51] Int. Cl. ..............................................G11c 11/42
[58] Field of Search..340/174 YC, 174.1 M, 173 LT; 350/151

[56] References Cited

UNITED STATES PATENTS 3,491,351   1/1970   Snaller et al. ...................340/174 YC
3,624,622   11/1971  Chen..............................340/174.1 M

OTHER PUBLICATIONS

Fan, G., et al. "Analysis of a Magneto-ptic Readout System". EEE Transactions on Electronic Computers; February 1963; pp. 3-9.

Freiser, M. J. "Magnetic Recording with Laser Beams". IBM Technical Disclosure Bulletin; Vol. 8, No. 2; July 1965; pp. 291-292.

Lewicki, G. "Narrow Currie-oint Switching." Applied Physics Letters; Vol. 16, No. 6; Mar. 15, 1970, pp. 240–243.

*Primary Examiner*—Bernard Konick
*Assistant Examiner*—Gary M. Hoffman
*Attorney*—Lamont B. Koontz, Omund R. Dahle and David R. Fairbairn

[57] ABSTRACT

In an optical mass memory utilizing Curie point writing, information is stored on a manganese bismuth film having low and high temperature crystallographic phases. The Kerr or Faraday magneto-optic rotation angle exhibited by a region of manganese bismuth having a low temperature crystallographic phase is different from the magneto-optic rotation angle exhibited by a region having the high temperature crystallographic phase. The magnetization direction of a region is sensed independent of the crystallographic phase. A magneto-optic readout system is utilized in which the extinction axis of the analyzer is set at an angle between the low temperature and the high temperature phase magneto-optic rotation angles for a "0" bit. Therefore the output from a low temperature "0" bit is identical to that of a high temperature phase "0" bit.

5 Claims, 7 Drawing Figures

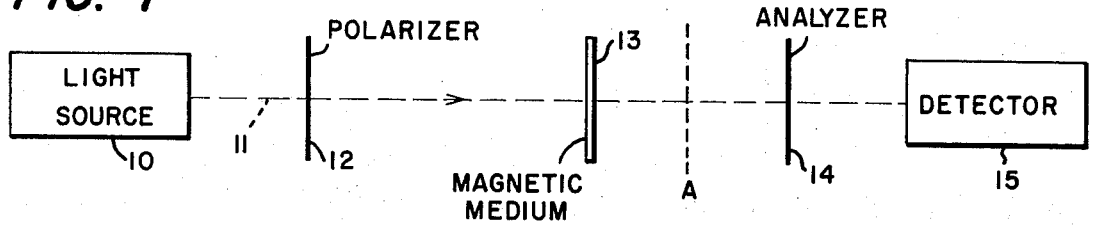
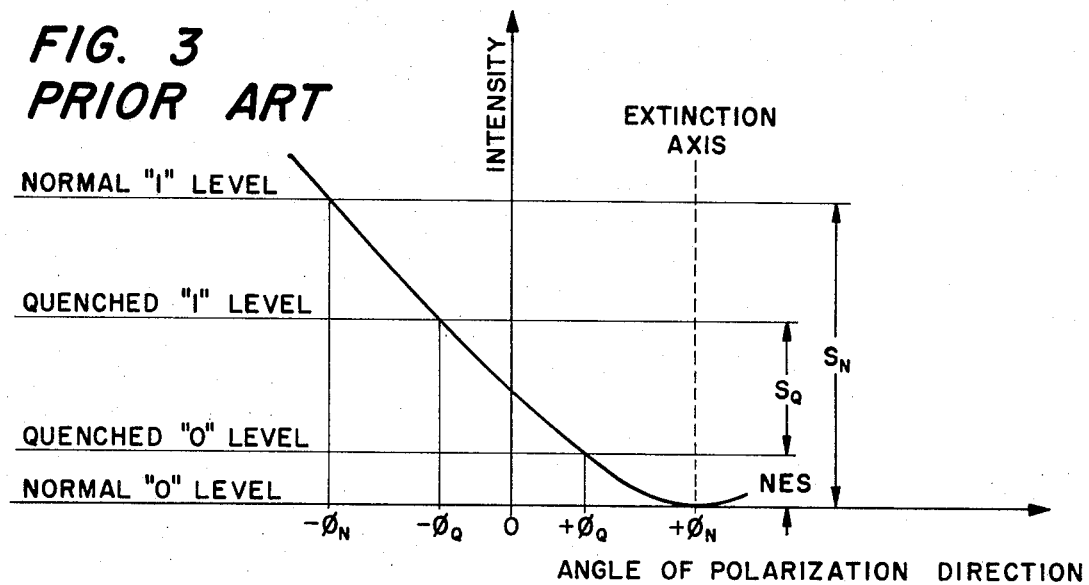
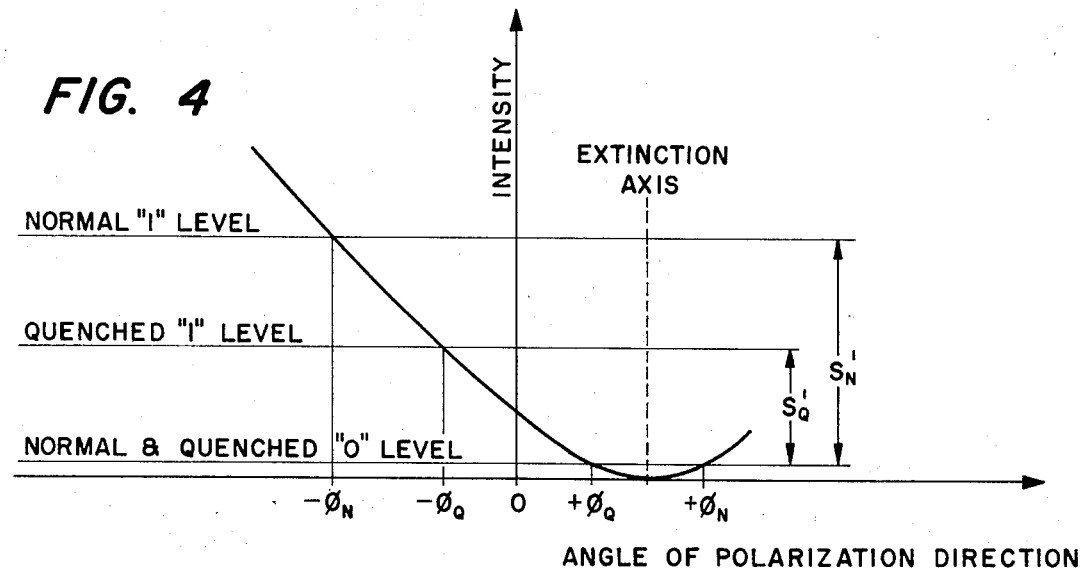
INVENTORS
ROGER L. AAGARD
FRANCIS M. SCHMIT
BY *Osmund R. Dahle*
ATTORNEY INVENTORS
ROGER L. AAGARD
FRANCIS M. SCHMIT
BY
Omund R. Dahle
ATTORNEY.

MAGNETO-OPTIC READOUT SYSTEM

BACKGROUND OF THE INVENTION

The present invention relates to a system for reading out stored information. More particularly, the present invention relates to a magneto-optic system for reading out stored information on a magnetic film having two temperature dependent crystallographic phases.

Recently, information storage systems which provide high density information storage have been much in demand. This is a result of the expansion of computer usage into areas placing extensive requirements on the computer's storage facilities. One type of information storage system which meets the requirements of high density information storage is a beam addressed optical mass memory in which information is stored on a magnetic film. One particularly advantageous optical mass memory utilizes a laser to provide Curie point writing.

Despite the many advantages of Curie point writing, one possible limitation which has arisen is that certain magnetic films, such as manganese bismuth, produce a "leakage light" or "non-erasable" signal (NES) after repeated write-erase cycling of the film. This leakage light signal has been found experimentally to occur after a few write-erase cycles. Generally this effect saturates and stabilizes causing a reduction in the contrast between background and the "written" readout signals.

It has been found experimentally that the reduction in contrast between background and the written "bit" readout signals is caused by the written portions of the film gradually transforming from the original low temperature crystallographic phase into the high temperature crystallographic phase, sometimes termed the "quenched" phase, as a result of repeated write-erase cycles. The unwritten portions of the film remain in the low temperature crystallographic phase, sometimes called the "normal" phase.

SUMMARY OF THE INVENTION

The magneto-optic system of the present invention determines the magnetization direction of the regions of a magnetic medium. The material forming the magnetic medium has first and second crystallographic phases. The regions or "bits" have either a first or second magnetization direction. The region having the first magnetization direction exhibits a first magneto-optic rotation angle when the material of that entire region has the first crystallographic phase and exhibits a second, different, magneto-optic rotation angle when the material of the entire region has the second crystallographic phase.

A light source means directs a polarized light beam to a region of the magnetic medium. Analyzer means is positioned to receive the polarized light beam from the region. The extinction axis of the analyzer means is set at a critical angle between the first and second magneto-optic rotation angles exhibited by the first magnetization direction. The intensity of the polarized light beam passed by the analyzer means when the region has a first magnetization direction and a first crystallographic phase is essentially identical to the intensity of the polarized light beam passed by the analyzer means when the region has a first magnetization direction and a second crystallographic phase. Detector means is positioned to receive the polarized light beam from the analyzer means and to produce an output signal indicative of the intensity of the polarized light beam received.

BRIEF DESCRIPTION OF THE DRAWINGS

FIG. 1 is a diagrammatic illustration of a magneto-optic readout system.

FIG. 3 shows the intensity of the polarized light beam passed by the analyzer as a function of the angle of polarization direction for a prior art magneto-optic readout system.

FIG. 4 shows the intensity of polarized light passed by the analyzer as a function of the angle of polarization direction for the magneto-optic system of the present invention.

DESCRIPTION OF THE PREFERRED EMBODIMENTS

Figure 2A:
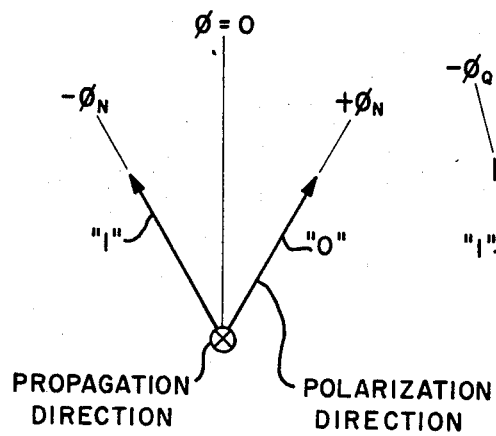
FIG. 2 illustrates the magneto-optic rotation angles exhibited by the two crystallographic phases.

FIG. 1 shows a typical magneto-optic readout system for an optical mass memory. A light source 10 provides a light beam 11 which passes through polarizer 12 and impinges upon magnetic medium 13. Analyzer 14 receives the polarized light beam transmitted by magnetic medium 13. Detector 15 is positioned to receive the polarized light beam 11 from analyzer 14 and produces an output signal indicative of the intensity of the light beam received.

In this system, magnetic medium 13 has two crystallographic phases. In particular, in the case of manganese bismuth film, the two phases are the normal and the quenched phase. The magnetic properties of magnetic medium 13 are different for the phases. In particular, the magneto-optic rotation angles exhibited by the two phases are different.

FIG. 2a shows the polarization direction of light beam 11 at plane A after passage through a region or "bit" of magnetic medium 13 having the normal phase only. The magneto-optic rotation angles have been shown exaggerated for explanation purposes. If the region has a first magnetization direction, the polarization direction of light beam 11 is rotated by a positive angle $+\phi_N$ from the original polarization direction. If the region has a second magnetization direction, the polarization direction of light beam 11 is rotated by an equal but opposite angle $-\phi_N$. For reference purposes, a region which has the first magnetization direction is designated as a binary "0" bit, and a region which has the second magnetization direction is designated as binary "1" bit.

Figure 2B:
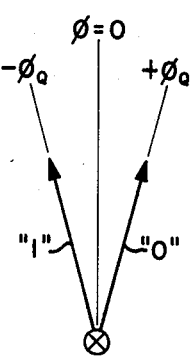

FIG. 2b shows the polarization direction of light beam 11 at plane A after passage through a region of magnetic medium 13 having the quenched phase only. As in the case of normal phase regions, first and second magnetization directions rotate the polarization direction of light beam 11 by a positive angle $+\phi_Q$, or an equal but opposite angle $-\phi_Q$, respectively. It can be seen that the magnitude of the magneto-optic rotation angle $\phi_Q$ exhibited by the quenched phase region is less than the magnitude of the magneto-optic rotation angle $\phi_N$ exhibited by the normal phase region. In manganese bismuth film, the magnitude of $\phi_N$ is approximately 6°, while the magnitude of $\phi_Q$ is about 3°.

Figure 2C:
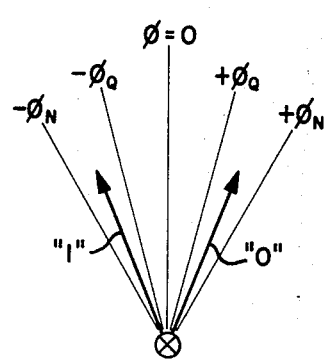

In operation, as a region or bit is subjected to repeated write-erase cycles, portions of the region are converted to the quenched phase. Eventually the entire region is converted from the normal phase to the quenched phase. The quenched phase portions of the region exhibit a magneto-optic rotation angle $\phi_Q$ while the normal phase portions exhibit a magneto-optic rotation $\phi_N$. FIG. 2c shows the polarization direction of light beam 11 at plane A after passage through a region of magnetic medium 13 having portions of each of the two phases. The effective magneto-optic rotation angle exhibited by a "0" bit having portions of each of the two phases is an angle between $+\phi_Q$ and $+\phi_N$ which is dependent upon the relative areas of the normal and quenched phase portions. Similarly, the effective magneto-optic rotation angle exhibited by a "1" is an angle between $-\phi_Q$ and $-\phi_N$.

FIG. 3 shows intensity of the light transmitted by analyzer 14 as a function of the angle of polarization direction of light beam 11 at plane A for a prior art magneto-optic readout system. As in FIG. 2, an angle corresponding to 0° represents the original polarization direction of light beam 11 prior to passage through magnetic medium 13. In the prior art system, the extinction axis of analyzer 14 is set to correspond to $+\phi_N$. Therefore, the intensity is a minimum at $+\phi_N$.

From FIG. 3 it can be seen that a "0" bit having entirely the normal phase produces a minimum signal. However, a "0" bit having portions in the quenched phase produces an output signal which is greater than the normal phase "0" level. This non-erasable signal NES reaches a maximum when the entire bit has the quenched phase. It can also be seen that the difference between the "0" and "1" levels of the quenched phase film, $S_Q$, is considerably less than the difference $S_N$ between the "0" and the "1" levels of the normal phase film.

With the prior art system ambiguity can arise between the "0" level of one phase and the "1" level of the other phase. In particular, a "0" bit in the quenched phase can look like a "1" bit in the normal phase under some conditions. This may be due to the variation in the magnitude of the magneto-optic rotation from bit to bit. This can be due to variations in film thickness, or, more seriously, due to appreciable variations in the bit size from bit to bit.

In the present invention the possibility of ambiguity of signal levels is essentially eliminated. As shown in FIG. 4, in the present invention the extinction axis of analyzer 14 is set at a critical angle between $+\phi_N$ and $+\phi_Q$. In particular, the extinction axis bisects the angle between $+\phi_Q$ and $+\phi_N$ such that the intensity of the light beam passed by analyzer 14 is the same for a "0" bit having the normal phase only and a "0" bit having the quenched phase only. Therefore the "0" level of the two phases is the same. The signal from a "0" bit never exceeds the "0" level during the transformation from entirely normal phase to entirely quenched phase.

Figure 5:
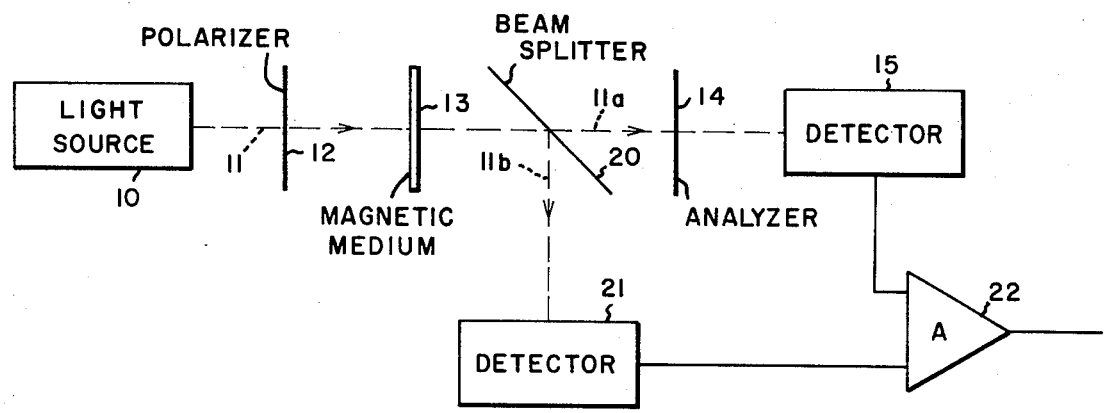
FIG. 5 is a diagrammatic illustration of another embodiment of the magneto-optic readout system of the present invention.

FIG. 5 shows another magneto-optic system similar to that of FIG. 1 which utilizes the present invention. Similar numerals are used to designate similar elements. Beam splitter 20 is positioned between magnetic medium 13 and analyzer 14. After passing through beam splitter 20, light beam 11 is split into two portions, 11a and 11b. The first portion 11a is directed to analyzer 14. The extinction axis of analyzer 14 is set at an angle between the first and second magneto-optic rotation angles $+\phi_N$ and $+\phi_Q$ such that the normal and quenched phase "0" are identical. First detector 15 receives light beam 11 from analyzer 14 and produces a first output signal indicative of the intensity of light beam 11a. The second portion 11b of the polarized light beam is directed to second detector 21 which produces a second output signal indicative of the intensity of second portion 11b. Comparing means 22 such as a differential amplifier receives the first and second output signals from first and second detectors 15 and 21, respectively, and produces a signal indicative of the difference between the first and second output signals. This differential readout technique allows for cancellation of common mode noise due to surface imperfections and fluctuations in the output of the light source.

While this invention has been disclosed with particular reference to the preferred embodiments, it will be understood by those skilled in the art that changes in form and details may be made without departing from the spirit and scope of the invention. For example, although the particular embodiments shown in FIGS 1 and 5 utilize the Faraday magneto-optic effect, the Kerr magneto-optic effect, in which analyzer 14 is positioned to receive a polarized light beam reflected from magnetic medium 13, can be used as well.

The embodiments of the invention in which an exclusive property or right is claimed are defined as follows:

1. A magneto-optic system for determining the magnetization direction of regions of a magnetic medium, the material forming the magnetic medium having first and second crystallographic phases, wherein the regions have either a first or a second magnetization direction, and wherein a region having the first magnetization direction exhibits a first magneto-optic rotation angle when the material of the entire region has the first crystallographic phase and a second, different, magneto-optic rotation angle when the material of the entire region has the second crystallographic phase, the system comprising:

light source means for directing a polarized light beam to a region of the magnetic medium, analyzer means positioned to receive the polarized light beam from the region, the analyzer means having its extinction axis set at an angle between the first and second magneto-optic rotation angles exhibited by the first magnetization direction, such that the intensity of the polarized light beam passed by the analyzer means when the region has a first magnetization direction and a first crystallographic phase is essentially identical to the intensity of the polarized light beam passed by the analyzer means when the region has a first magnetization direction and a second crystallographic phase, and first detector means positioned to receive the polarized light beam from the analyzer means and to produce a first output signal indicative of the intensity of the polarized light beam received.

2. The invention as described in claim 1 wherein the analyzer means is positioned to receive a polarized light beam reflected from the region.

3. The invention as described in claim 1 wherein the analyzer means is positioned to receive a polarized light beam transmitted by the region.

4. The invention as described in claim 1 and further comprising:
   beam splitting means positioned between the magnetic film and the analyzer means for directing a first portion of the polarized light beam to the analyzer means and a second portion of the polarized light beam over a second path,
   second detector means positioned to receive the second portion of the polarized light beam and to produce a second output signal indicative of the intensity of the second portion of the polarized light beam, and
   comparing means for receiving the first and second output signals and producing a signal indicative of the difference between the first and second output signals.

5. The invention as described in claim 1 wherein the magnetic medium is manganese bismuth film.

* * * * *